United States Patent [19]

Childre

[11] Patent Number: 4,578,890
[45] Date of Patent: Apr. 1, 1986

[54] FISHING ROD FOREGRIP AND REEL SECUREMENT DEVICE

[75] Inventor: Casey J. Childre, Foley, Ala.

[73] Assignee: Lew Childre & Sons, Inc., Foley, Ala.

[21] Appl. No.: 674,721

[22] Filed: Nov. 26, 1984

Related U.S. Application Data

[63] Continuation of Ser. No. 590,559, Mar. 19, 1984, abandoned, which is a continuation of Ser. No. 268,349, May 29, 1981, abandoned.

[51] Int. Cl.$^4$ .............................................. A01K 87/06
[52] U.S. Cl. .............................................. 43/20; 43/22
[58] Field of Search ........................... 43/20, 22, 18.1

[56] References Cited

U.S. PATENT DOCUMENTS

| | | | |
|---|---|---|---|
| 1,870,078 | 8/1932 | Welch | 43/22 |
| 1,980,317 | 11/1934 | Clark | 43/22 |
| 2,756,531 | 7/1956 | Hollenshead | 43/22 |
| 3,060,617 | 10/1962 | Hamp | 43/22 |
| 4,133,133 | 1/1979 | Casset | 43/22 |
| 4,216,603 | 8/1980 | Takeuchi | 43/22 |

FOREIGN PATENT DOCUMENTS 2017471 10/1979 United Kingdom ............... 22/

Primary Examiner—Nicholas P. Godici
Assistant Examiner—M. Jordan
Attorney, Agent, or Firm—Lockwood, Alex, FitzGibbon & Cummings

[57] ABSTRACT

A fishing rod handle which includes a combination foregrip and reel securement assembly is described wherein the foregrip is of streamlined, tubular construction and is threadedly secured to a section of the rod handle that is positioned immediately forwardly of a reel seat on the handle. The reel securement component of this assembly is, in a preferred embodiment, rotatably secure to the foregrip which is free of any awkward, outwardly extending protrusions. The reel securement component and foregrip cooperate to clampingly engage the forwardly extending flange of a reel foot of a fishing reel mounted to said rod handle in a manner by which all threads on the rod handle are at least substantially fully concealed and by which loosening of the reel securement component is effectively resisted.

1 Claim, 6 Drawing Figures

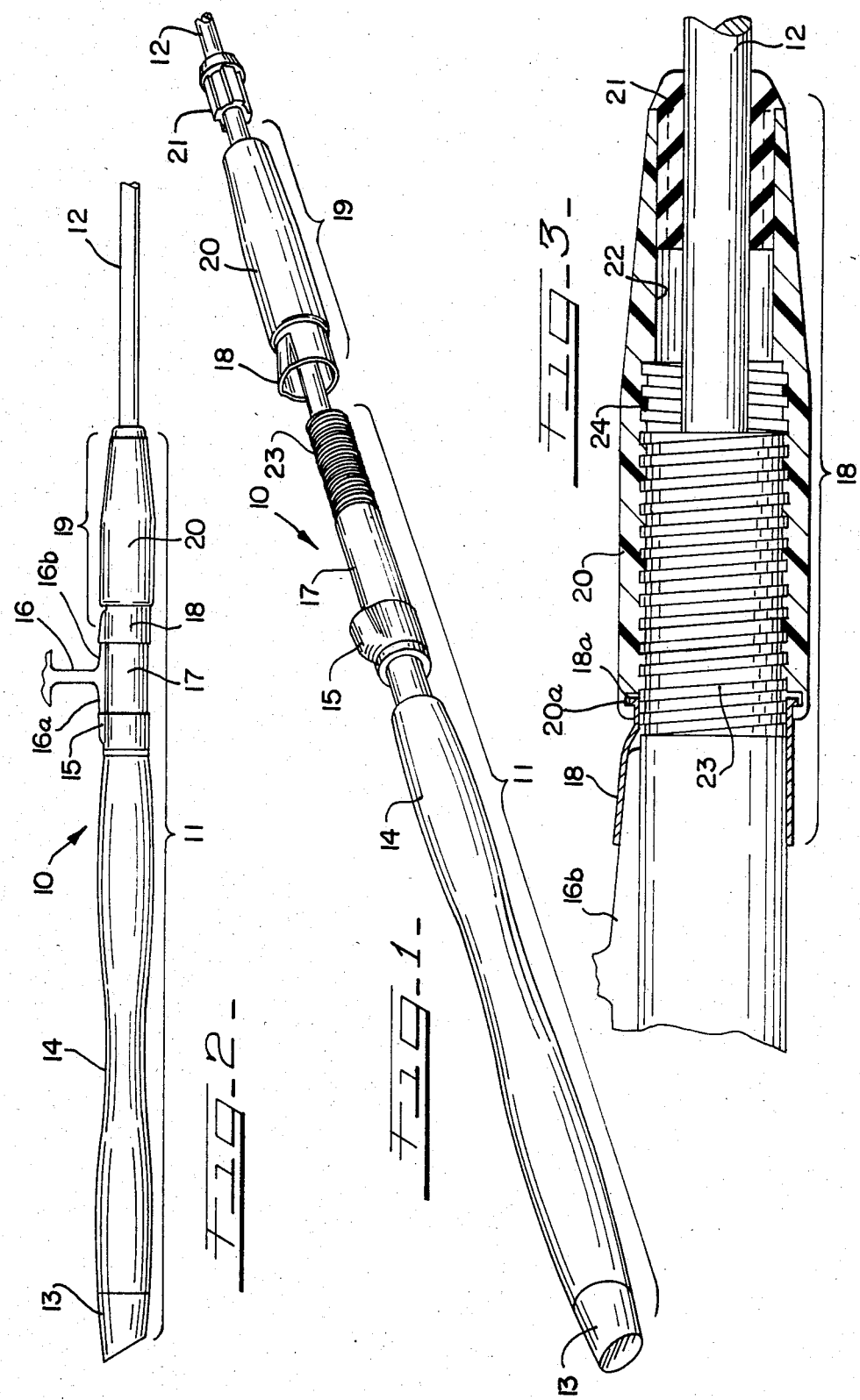

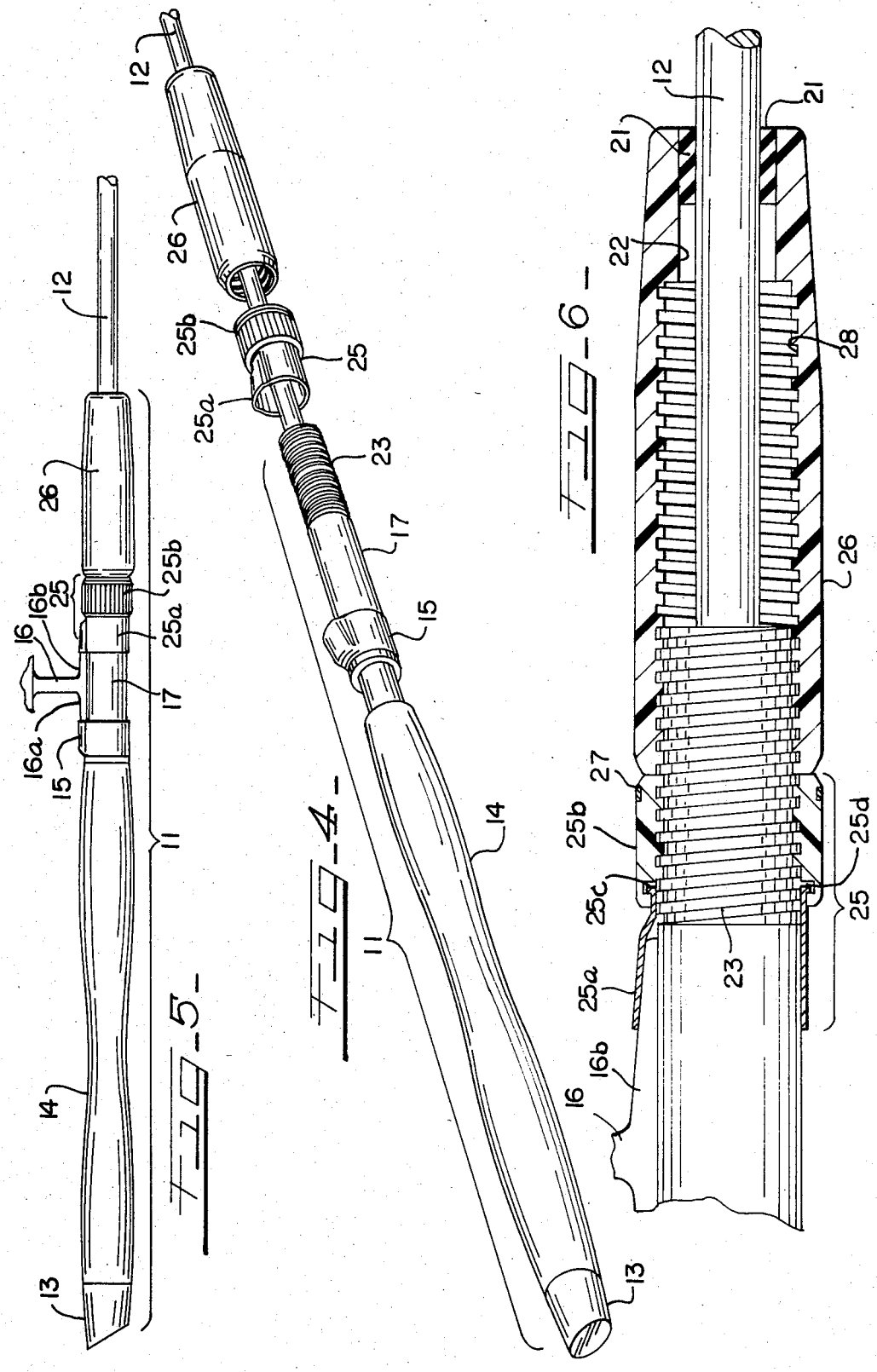

FISHING ROD FOREGRIP AND REEL SECUREMENT DEVICE

This is a continuation of application Ser. No. 590,559 filed Mar. 19, 1984 abandoned which is a continuation of application Ser. No. 268,349 filed may 29, 1981 abandoned.

BACKGROUND AND DESCRIPTION OF THE INVENTION

The present invention generally relates to fastening devices for securing fishing reels to fishing rods and, more particularly, to an improved fishing rod foregrip and reel securement assembly. In this regard, an important aspect of the present invention concerns a unique fishing rod foregrip and reel locking assembly which is free of any awkward protrusions as well as any exposed threads, which assembly is characterized by a foregrip that is both attractive in appearance and comfortable to use as well as a reel securement device which resists loosening during use.

Conventional fishing rods commonly include a handle portion having a generally elongated body from which a rod blank axially extends. Typically, the handle portion includes an aft grip, a pair of reel flange engaging members, at least one of which is movable, and a foregrip. While the reel flange engaging members are usually held in place by a locking nut, it is not uncommon for such flange engaging members to become loose during use by reason of movement of the locking nut. Additionally, these conventional arrangements have been characterized by undesirable exposed threads on the main handle body which, among other things, are uncomfortable to the user during a casting and line retrieval operation.

Various efforts to overcome the foregoing disadvantages have been proposed in the prior art. For example, U.S. Pat. No. 4,045,902 describes a reel fastening device which utilizes an aft flange engaging member in the form of a fixed hood and a forward reel flange engaging member in the form of a movable hood. The movable hood, however, is held in place by means of a fastening collar which is threadedly mounted to the handle portion of the fishing rod. This arrangement is not fully satisfactory in that it does not adequately resist loosening forces and also is characterized by a substantial number of exposed threads on the main handle body.

One prior art effort to overcome the presence of exposed threads on the handle body of a fishing rod is reflected in U.S. Pat. No. 3,883,978 which utilizes a plurality of overlapping sleeves and covers. As such, this prior art arrangement is characterized by a rod handle which is not only complex in construction, but which also significantly restricts the length to which the rod blank can be inserted into the elongated handle body, a disadvantage which is particularly serious to the custom rod maker.

The present invention overcomes the above-described disadvantages of heretofore known fishing rod handle constructions by providing an improved combination foregrip and reel securement assembly wherein the foregrip is of streamlined, tubular construction and is threadedly secured to a section of the rod handle which is immediately forward of the reel seat. The reel securement component of this assembly is, in a preferred embodiment, rotatably secured to the foregrip and cooperates with the foregrip to clampingly engage the forwardly extending flange of a reel foot in a manner by which all threads on the rod handle are concealed. As such, the foregrip and reel securement assembly of the present invention is characterized by a streamlined appearance, free of any awkward protrusions, wherein the threaded portion of the rod handle is fully concealed when a fishing reel is mounted to the rod and secured thereto by such assembly.

It is, therefore, an object of the present invention to provide an improved fastening device which overcomes the deficiencies of heretofore known fishing rod handle constructions.

Another object of the present invention is to provide a unique combination foregrip and reel securement assembly which is characterized by a streamlined configuration that is comfortable to use during both casting and line retrieval operations.

Another object of the present invention is to provide an improved reel securement device for a fishing rod which resists loosening during use.

Another object of the present invention is to provide an improved combination foregrip and reel securement assembly wherein at least substantially all of the threads on the rod handle are concealed in use and which, at the same time, affords so-called through rod construction, enabling the rod blank to extend throughout the continuous length of the fishing rod handle.

These and other objects of the present invention will be apparent from the following detailed description of a preferred embodiment, taken in conjunction with the accompanying drawings in which identical numerals designate like elements wherein:

FIG. 1 is an exploded perspective view of a fishing rod shown with a partial rod blank which fishing rod includes a handle, reel seat, and foregrip assembly embodying the present invention;

FIG. 2 is a side elevational view of the fishing rod shown in FIG. 1 with the reel foot portion of a fishing reel (not shown) mounted thereto;

FIG. 3 is a partial vertical cross-sectional view of the fishing rod and reel foot portion shown in FIG. 2;

FIG. 4 is an exploded perspective view of a fishing rod shown with a partial rod blank which rod includes a handle, reel seat and foregrip assembly having a construction in accordance with another embodiment of the present invention;

FIG. 5 is a side elevational view of the fishing rod shown in FIG. 4 having a reel foot portion of a fishing reel (not shown) mounted thereto; and FIG. 6 is a partial vertical cross-sectional view of the fishing rod and reel foot portion shown in FIG. 5.

Referring to the drawings, and with particular reference to the embodiment of the present invention shown in FIGS. 1-3, the reference numeral 10 generally designates a fishing rod having a handle 11 from which a rod blank 12 axially extends. As shown, the handle 11 incorporates an elongated body having an end cap 13, an aft grip portion 14, and a fixed reel foot engaging component 15 which snugly receives the rearwardly extending flange 16a of a reel foot 16 that is mounted to a reel seat portion 17 of the handle 11. A forwardly extending flange 16b of reel foot 16 is likewise snugly received within a flange engaging component 18 of a combination foregrip and reel securement assembly 19. Flange engaging components 15 and 18 are shaped to conform to the flanges 16a and 16b, respectively, and cooperate to releasably secure the feel foot 16 to the seat portion 17 of the handle 11.

As best shown in FIG. 3, the reel flange engaging component 18 of the assembly 19 is rotatably fixed to a foregrip 20 by an integral outwardly flared retention flange 18a which is received within a groove 20a of the foregrip 20 which has an outer configuration that is streamlined and free of any outwardly extending protrusions. The forward end of the foregrip 20 is open ended and adapted to receive a grommet or plug 21 which preferably is composed of a resilient material and includes an outer rib construction that is adapted to be snugly received within the internal bore 22 of the foregrip. Grommet 21 is of annular construction and includes a bore 21a that is sized to tightly receive the rod blank 12 and form a seal therearound which precludes contaminants from entering the chamber 22a.

Referring to FIG. 1, it will be noted that the handle portion 11 includes a threaded section 23 which is located immediately forwardly of the reel seat 17. Correspondingly, as best shown in FIG. 3, the foregrip 20 includes a plurality of internal threads 24 which extend substantially along the entire length of the foregrip body and cooperate with the threaded portion 23 on the rod handle to firmly, but releasably, secure the foregrip thereto. In this regard, it will be observed that in the assembled construction shown in FIGS. 2 and 3, that the threaded portion 23 of the rod handle is fully concealed when a reel is secured to the rod handle.

Referring to the embodiment shown in FIGS. 4 through 6, it will be noted that essentially all of the components depicted therein are identical to those shown in the embodiment of FIGS. 1 through 3 with the exception of the combination foregrip and reel securement assembly which, in the embodiment of FIGS. 4 through 6, is depicted as a two-part assembly composed of a combination forward reel foot flange engaging-locking nut component 25 and a foregrip 26. As shown, the component 25 includes a reel-foot engaging hood 25a having an integral outwardly flared retention flange 25c which is rotatably secured with a groove 25d in a locking nut 25b which is of annular construction and provided with a plurality of internal threads 27 that permit the assembly 25 to be locked into a position wherein the hood 25 snugly engages the reel foot flange element 16b. Correspondingly, the foregrip 26 is of a tapered tubular construction and provided with a plurality of internal threads 28 that cooperate with the threaded portion 23 of the rod handle to secure the foregrip in a location on the rod handle such that it will serve to act as a backup or locking ring for the assembly 25.

As was true with the previously described embodiment, the foregrip 26 likewise includes a resilient grommet 21 which provides a tight seal with the rod blank 12 that serves to inhibit dirt and grime from entering into the interior of the foregrip chamber, thereby avoiding fowling of the threads and also assisting in providing a secure foregrip which resists loosening.

It will be appreciated that each of the foregoing embodiments is characterized by a number of significant advantages, one of which being that they permit so-called through rod construction, that is they enable the full diameter rod blank to be inserted throughout the full length of the handle body. Other advantages, as previously noted, include the streamlined foregrip configuration which is both attractive in appearance and comfortable to use. Additionally, both embodiments of the present invention afford full concealment of the threaded portion 23 of the rod handle and enhanced reel securement that reliably resists loosening during use.

It will be apparent to those skilled in this art that the present invention can be embodied in various forms and that, accordingly, this invention is to be construed and limited only by the scope of the appended claims.

I claim:

1. A fishing rod comprising a substantially straight and forwardly tapered rod blank, a rod handle having a generally elongated hollow body adapted to receive the aft most portion of said substantially straight and forwardly tapered rod blank substantially throughout the entire body thereof, said handle including an aft grip portion which extends forwardly into a reel seat portion, a fixed rear reel-foot engaging member mounted to said reel seat portion and adapted to receive a rearwardly extending flange of a reel mounted to said fishing rod, said reel seat portion of said elongated body extending forwardly into a threaded portion coaxial with the substantially straight and forwardly tapered rod blank, and a foregrip and reel securement assembly which is axially slidable as a unit along a forward portion of said elongated body, said assembly including a reel-foot engaging member axially fixed to said foregrip and rotatably mounted with respect thereto, said reel-foot engaging member being adapted to receive a forwardly extending flange of a reel mounted to said fishing rod, said foregrip having an axial length which is greater than the axial length of said forward reel-foot engaging member in said assembly, said foregrip including a generally resilient forward annular surface adapted to slidingly engage the exterior surface of the rod blank along the axial travel of said assembly, said foregrip portion of said assembly having an exterior tubular body and interior threads which cooperate with the threaded portion of said elongated body to axially fix the reel-foot engaging member in overlying relationship on a forwardly extending flange of a reel mounted to said handle and thereby securely retain said reel in said reel seat, said assembly dimensioned to overlap the entire threaded portion of said elongated body forward of the forwardly extending flange of a reel mounted to said handle so as to fully conceal said threaded portion of said elongated body of said handle.

* * * * *

UNITED STATES PATENT AND TRADEMARK OFFICE
CERTIFICATE OF CORRECTION

PATENT NO. : 4,578,890

DATED : April 1, 1986

INVENTOR(S) : Casey J. Childre

It is certified that error appears in the above—identified patent and that said Letters Patent is hereby corrected as shown below:

Column 2, line 67, "feel" should read --reel--.

Signed and Sealed this

Twelfth Day of August 1986

[SEAL]

Attest:

DONALD J. QUIGG

Attesting Officer

Commissioner of Patents and Trademarks